(12) United States Patent
Shishido

(10) Patent No.: US 6,876,615 B2
(45) Date of Patent: Apr. 5, 2005

(54) DATA RECORDING APPARATUS, DATA RECORDING METHOD, AND OPTICAL RECORDING MEDIUM INCLUDING PSUEDO-ERASING FEATURES

(75) Inventor: Yukio Shishido, Kanagawa (JP)

(73) Assignee: Sony Corporation, Tokyo (JP)

( * ) Notice: Subject to any disclaimer, the term of this patent is extended or adjusted under 35 U.S.C. 154(b) by 657 days.

(21) Appl. No.: 09/819,849

(22) Filed: Mar. 29, 2001

(65) Prior Publication Data

US 2001/0026518 A1 Oct. 4, 2001

(30) Foreign Application Priority Data

Mar. 30, 2000 (JP) ......................................... 2000-097943

(51) Int. Cl.[7] ............................................... G11B 7/007
(52) U.S. Cl. ..................................... 369/53.24; 369/83
(58) Field of Search ............................... 369/53.26, 83, 369/53.24

(56) References Cited

U.S. PATENT DOCUMENTS

| | | |
|---|---|---|
| 5,559,778 A | 9/1996 | Inokuchi et al. |
| 6,370,096 B1 * | 4/2002 | Hashimoto .................. 369/53.2 |
| 6,373,803 B2 * | 4/2002 | Ando et al. ............... 369/59.25 |
| 6,456,783 B1 * | 9/2002 | Ando et al. .................. 386/125 |

FOREIGN PATENT DOCUMENTS

| | | |
|---|---|---|
| EP | 0 712 130 | 5/1996 |
| JP | 06-267077 | 9/1994 |
| JP | 11-007726 | 1/1999 |
| JP | 11-126429 | 5/1999 |
| JP | 2000-030369 | 1/2000 |
| JP | 2000-149447 | 5/2000 |
| JP | 2000-215446 | 8/2000 |

* cited by examiner

Primary Examiner—Gautam R. Patel
(74) Attorney, Agent, or Firm—Oblon, Spivak, McClelland, Maier & Neustadt, P.C.

(57) ABSTRACT

Data is recorded on packet basis to a track of an optical recording medium and the data is pseudo-erased by erasing contents information of the track having the data. Information indicating the end position of the packet containing the data is recorded on the optical recording medium and a new data is recorded to the track where the data has been pseudo-erased in accordance with the information indicating the end position of the packet.

25 Claims, 11 Drawing Sheets

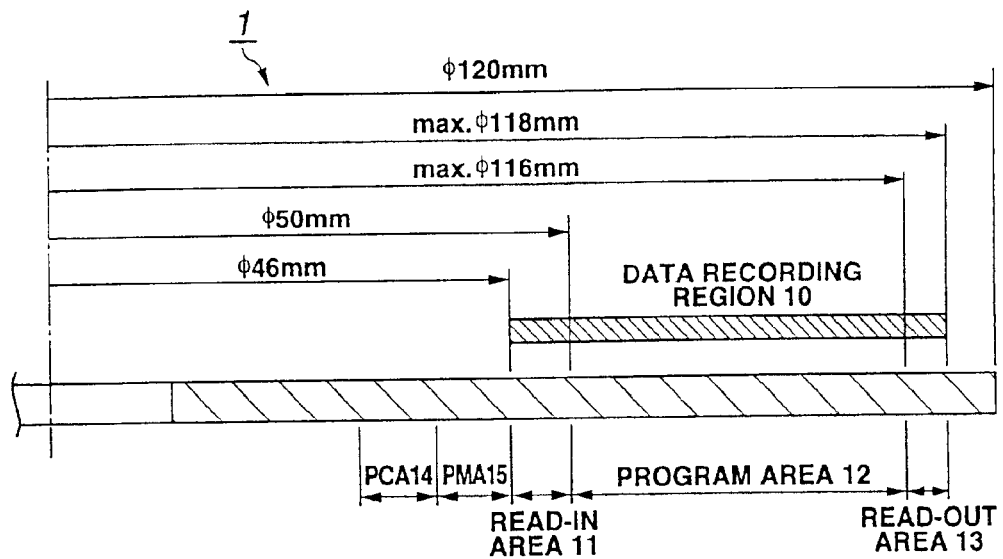
FIG.5
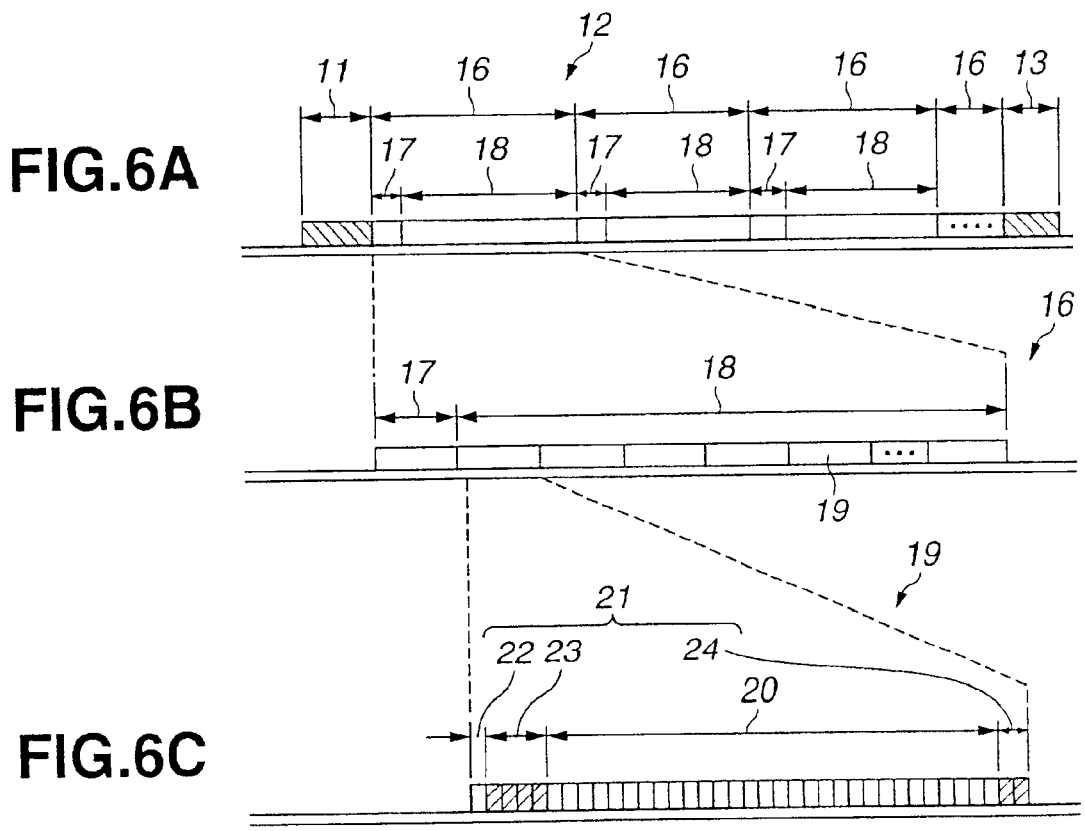
FIG.6A
FIG.6B
FIG.6C

|  | CONTENTS |  |  |  |  |  |  |
|---|---|---|---|---|---|---|---|
| TRACK DESCRIPTOR TABLE | 0 | 54 | | | | | |
| | 1 | 44 | | | | | |
| | 2 | 49 | | | | | |
| | 3 | 01 | | | | | |
| | 4 | 50 | | | | | |
| | 5 | 00 | | | | | |
| | 6 | 01 | BYTE | CONTENTS | BYTE | CONTENTS | BYTE | CONTENTS |
| | 7 | 04 | | | | | | |

| | | BYTE | CONTENTS | BYTE | CONTENTS | BYTE | CONTENTS |
|---|---|---|---|---|---|---|---|
| TRACK DESCRIPTOR UNITS | 8 | 04 | 24 | 01 | 40 | 02 | 56 | 04 |
| | 9 | 80 | 25 | 91 | 41 | 91 | 57 | 90 |
| | 10 | FF | 26 | 00 | 42 | 00 | 58 | FF |
| | 11 | FF | 27 | 00 | 43 | 00 | 59 | FF |
| | 12 | FF | 28 | 32 | 44 | 64 | 60 | FF |
| | 13 | [00] | 29 | [00] | 45 | [00] | 61 | [00] |
| | 14 | [00] | 30 | [00] | 46 | [00] | 62 | [00] |
| | 15 | [00] | 31 | [00] | 47 | [00] | 63 | [00] |
| | 16 | [00] | 32 | [00] | 48 | [00] | 64 | [00] |
| | 17 | [00] | 33 | [00] | 49 | [00] | 65 | [00] |
| | 18 | [00] | 34 | [00] | 50 | [00] | 66 | [00] |
| | 19 | [00] | 35 | [00] | 51 | [00] | 67 | [00] |
| | 20 | [00] | 36 | [00] | 52 | [00] | 68 | [00] |
| | 21 | [00] | 37 | [00] | 53 | [00] | 69 | [00] |
| | 22 | [00] | 38 | [00] | 54 | [00] | 70 | [00] |
| | 23 | [00] | 39 | [00] | 55 | [00] | 71 | [00] |

| NON-USED BYTES | 72 | 00 |
|---|---|---|
| | .. | 00 |
| | .. | 00 |
| | 2047 | 00 |

FIG.10

| BYTE/BIT | 7 | 6 | 5 | 4 | 3 | 2 | 1 | 0 |
|---|---|---|---|---|---|---|---|---|
| 0 | 54th (ASCII "T") ||||||||
| 1 | 44th (ASCII "D") ||||||||
| 2 | 49th (ASCII "I") ||||||||
| 3 | PRE-GAP LENGTH ||||||||
| 4 | ||||||||
| 5 | Reserved ||||||| Current |
| 6 | Lowest Track Number ||||||||
| 7 | Highest Track Number ||||||||
| 8 | Track Number ||||||||
| 9 | RECORDING METHOD ||||||||
| 10 | (MSB) |||||||| 
| 11 | FIXED-LENGTH PACKET SIZE ||||||||
| 12 | (LSB) ||||||||
| 13 | Reserved (00) ||||||||
| 14 | MINIMAL BLANKING INFORMATION ||||||||
| 15 | Reserved (00) ||||||||
| 16 | (t) ||||||||
| 17 | PACKET POSITION INFORMATION ||||||||
| 18 | ||||||||
| 19 | (LSB) ||||||||
| 20 | Reserved (00) ||||||||
| 21 | Reserved (00) ||||||||
| 22 | Reserved (00) ||||||||
| 23 | Reserved (00) ||||||||
| : | ||||||||
| 2047 | ||||||||

FIG.11

DATA RECORDING APPARATUS, DATA RECORDING METHOD, AND OPTICAL RECORDING MEDIUM INCLUDING PSUEDO-ERASING FEATURES

BACKGROUND OF THE INVENTION

1. Field of the Invention

The present invention relates to a data recording apparatus and a data recording method for data recording on a packet basis onto a track of an optical recording medium as well as to an optical recording medium having a track on which data is recorded on a packet basis.

2. Description of the Related Art

In an optical disc such as a compact disc (CD), data recording is performed through small holes, called pits, formed on a recording surface of the disc. Data is reproduced by reading presence/absence of the pit and its length. As the disc of such CD-specification, there are also a CD-Recordable (CD-R) disc in which additional data can be written and a CD-Rewritable (CD-RW) disc in which data can be rewritten.

Data recording to the CD-R and the CD-RW is usually performed as data recording on a logical track basis defined by the CD specification. However, since the maximum number of write tracks to be written is limited to 99, there is a problem that it is impossible to sufficiently utilize the storage capacity of the optical disc.

More specifically, such a recordable optical disc has: a program area for recording up to 99 data items on a logic track base of an arbitrary size; a TOC (table of contents) for recording contents information of the tracks recorded in this program area; and a PMA (program memory area) for temporarily recording information required for recording data on the program area.

When a data item is recorded on a logical track, the logical track number containing this data and the information on the recording start and end positions on the logical track are recorded in the PMA. Moreover, when a new data item is recorded starting at the end position of the logical track, the track position information recorded in the PMA is read out, so that a new data item is recorded starting at the end position of the logical track and this logical track position information is recorded on the PMA.

However, in this optical disc, when the program area contains 99 logical tracks recorded, a new data item cannot be recorded even when an area available for recording is remaining in this program area. Thus, the optical disc has a problem that it is impossible to use the storage capacity sufficiently.

To solve this problem, a so-called packet write has been suggested as the recording method. This packet write method is based on the CD specification but data recording is performed in a further smaller packet basis than the conventional track. For a single logical track, it is possible to constitute a plurality of packets. That is, in this optical disc, by recording data on packet basis on the logical track, it becomes possible to record data exceeding 99 logical tracks. Thus, even in an optical disc based on the CD specification, it is possible to fully utilize its recording capacity.

In the optical disc, information indicating the logical track position is recorded in the PMA but no information indicating the packet position is recorded. When writing an additional data by the packet write, it is necessary to retrieve the logical track from the head to the trail so as to find a packet end position of the packet containing logical track data, i.e., an NWA (next writable address) where a new data of the logical track can be recorded.

Conventionally, to find this NWA, as has been described above, the logical track is successively retrieved from the head to the end or the recording state of the intermediate position of the logical track is repeatedly retrieved to define the range.

However, in the optical disc, as the recording area of the logical track to be retrieved is increased, the time required for finding this logical track NWA is also increased. For this, in the optical disc, when recording data on a packet basis on the logical track, the recording speed is lowered.

By the way, in the optical recording apparatus for recording/reproducing a rewritable optical disc has a so-called blank function for erasing data over the entire optical disc surface and a so-called minimally blank function for erasing only the contents information of the track having the optical disc data recorded, so that data is pseudo-erased.

According to this minimally blank function, it is possible to pseudo-erase data recorded in the program area by erasing the data recorded in the PMA as the contents information, the data recorded in the read-in area and the read-out area, and the data recorded in the track pre-gap. Thus, it is possible to erase data recorded on an optical disc with a minimum time.

However, in the optical disc having the aforementioned logical track on which data has been recorded on packet basis, if an additional data is recorded by the packet write after a pseudo-erase of data with respect to the logical track, in the area where the logical track data has been pseudo-erased, data existing prior to the pseudo-erase is actually recorded. Accordingly, there is often a case that a data is written at an erroneous position, considering that the pseudo-erased data is an actual data. That is, in this optical disc, the contents information of the logical track containing data is erased but the actual data still remains and no information indicating the packet position is recorded. Accordingly, when retrieving the aforementioned NWA, data may be recorded starting at an erroneous position by considering that the pseudo-erase data is an actual data.

SUMMARY OF THE INVENTION

It is therefore an object of the present invention to provide a data recording apparatus and a data recording method for an optical recording medium on which data is recorded on packet basis with respect to the track, enabling to detect accurately and in a short period of time a recordable position of a new data after pseudo-erasing a data as well as an optical recording medium for recording such data.

The data recording apparatus according to the present invention includes: data recording means for recording data on packet basis onto a track of an optical recording medium; data pseudo-erasing means for erasing contents information of the track containing the data, thereby pseudo-erasing the data; and packet position recording means for recording on an optical recording medium an information indicating the end position of the packet containing the data, wherein the data recording means records a new data onto a track where the data has been pseudo-erased, in accordance with the information indicating the end position of the packet.

In this data recording apparatus, the packet position recording means records on the optical recording medium an information indicating the end position of the packet containing the data and in accordance with the information indicating the end position of the packet, the data recording means records a new data onto the track where the data has been pseudo-erased. Accordingly, it is possible to accurately detect a new data recordable position within a short period of time and properly record a new data onto the track where the data has been pseudo-erased.

Moreover, the data recording method according to the present invention includes: a step of recording data on packet basis onto a track of an optical recording medium and erasing contents information of the track containing the data, thereby pseudo-erasing the data; a step of recording on an optical recording medium an information indicating the end position of the packet containing the data; and a step of records a new data onto a track where the data has been pseudo-erased, in accordance with the information indicating the end position of the packet.

In this data recording method, it is possible to accurately detect a new data recordable position within a short period of time and properly record a new data onto the track where the data has been pseudo-erased.

The optical recording medium according to the present invention has a track on which data is recorded on packet basis, the data being pseudo-erased by erasing only the contents information of the track having the data and has information recorded to indicate the end position of the packet containing the data.

In this optical recording medium, information indicating the end position of the packet containing data and accordingly, it is possible to accurately detect a new data recordable position within a short period of time and properly record a new data onto the track where the data has been pseudo-erased.

BRIEF DESCRIPTION OF THE DRAWINGS

FIG. 5 explains a data configuration of the optical disc.

FIG. 6 explains the data configuration of the optical disc: 6A explains the program area configuration; 6B explains the logical track configuration; and 6C explains the packet configuration.

FIG. 10 shows a user data field of TDB.

FIG. 11 shows a TDB format.

DETAILED DESCRIPTION OF PREFERRED EMBODIMENTS

Description will now be directed to embodiments of the present invention with reference to the attached drawings.

Firstly, explanation will be given on an optical disc according to the present invention.

Figure 1:
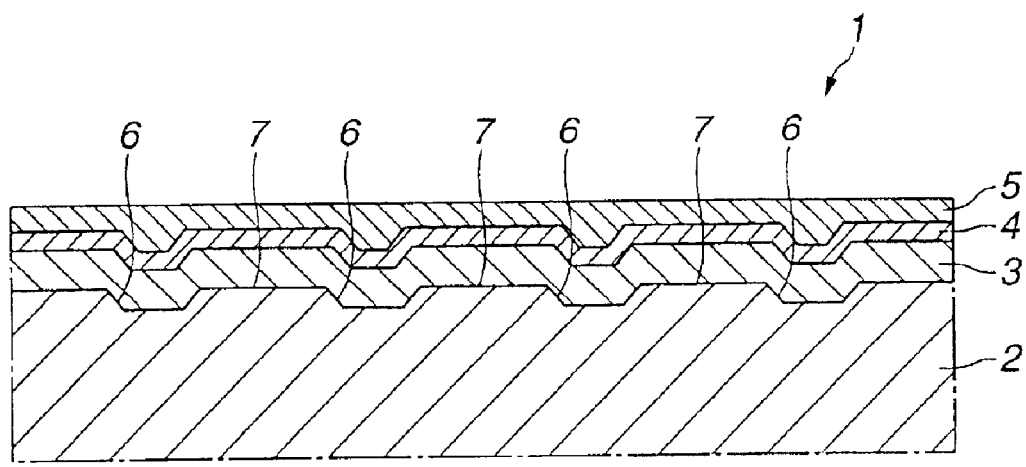
FIG. 1 is a cross sectional view of an essential portion of an optical disc according to the present invention.

As shown in FIG. 1, the optical disc 1 includes a disc substrate 2 made from a resin material such as polymethyl methacrylate (PMMA) and polycarbonate (PC) formed into a disc shape having an outer diameter of 120 mm and thickness of 1.2 mm; a signal recording layer 3 in which recording marks are formed in accordance with the recording data; a reflection layer 4 made from gold (Au), silver (Ag), and the like; and a protection layer 5 formed by spin-coating ultraviolet ray hardening resin. These layers are successively formed.

When the optical disc 1 is a writable CD-R for example, the signal recording layer 3 is a thin film formed from an organic pigment-based material. In this case, in the optical disc 1, a laser beam is applied to the signal recording layer 3 with a recording power, and a recording mark is formed to that position where the laser beam is applied, thereby writing data. On the other hand, a laser beam of reproducing power is applied to the signal recording layer 3 where the recording mark has been formed and a reflectance change of return light is detected in accordance with presence/absence of the recording mark, thereby reading out data. It should be noted that the CD-R is an optical disc where recording can be performed only once and its format is normalized by the Orange Book Part 2.

Moreover, when the optical disc 1 is a rewritable CD-RW for example, the signal recording layer 3 is a thin film formed from a phase change material having a crystalline state changing when heated by a laser beam. In this case, when a laser beam of recording power is applied to the signal recording layer 3 of the optical disc 1, a recording mark is formed at the position where the laser beam is applied, thereby writing data. On the other hand, a laser beam of reproducing power is applied to the signal recording layer 3 where the recording mark was formed and a reflectance change of return light in accordance with presence/absence of the recording mark is detected, thereby reading out data. It should be noted that the CD-RW is a rewritable optical disc and its format is normalized by the Orange Book Part 3. Moreover, the CD-RW has physical characteristics such as the reflectance of 0.2 as compared to 0.7 or above in the CD and the CD-R. Accordingly, it is preferable that reproducing be performed in an optical disc apparatus 30 having the AGC (auto gain control) function for amplifying a weak signal.

The disc substrate 2 has a center hole at its center portion. When recording/reproducing of the optical disc 1 is performed by an optical disc apparatus, the vicinity of this center hole is supported and fixed by a rotation drive mechanism of the optical disc apparatus so as to be driven to be rotated at a predetermined velocity. Moreover, the disc substrate 2 has a light transmission characteristic and a laser beam is incident from this disc substrate 2 so as to perform a data recording/reproducing to/from the signal recording layer 3.

Figure 2:
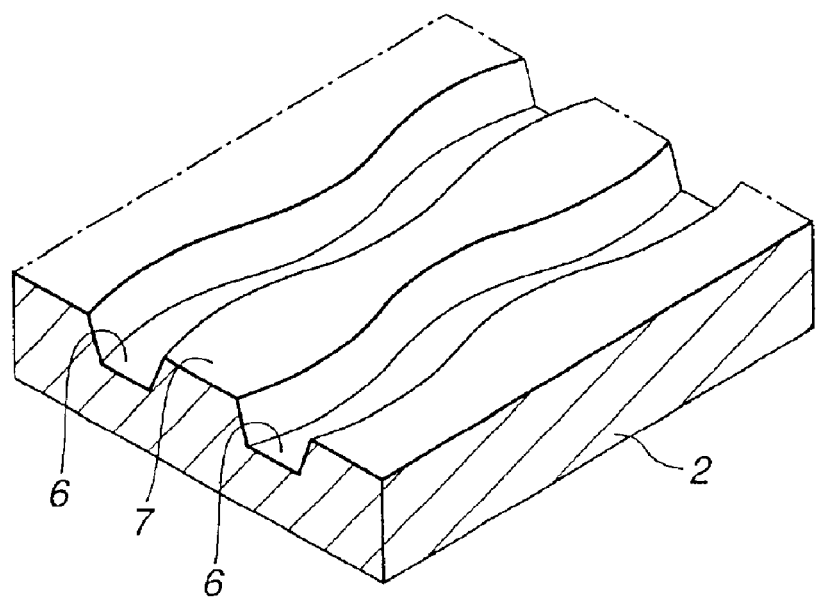
FIG. 2 is a perspective view of an essential portion of a disc substrate of the optical disc.

Moreover, as shown in FIG. 1 and FIG. 2, pregroove 6 as a guide is formed in a spiral shape at a data recording region on the disc substrate 2. In the signal recording layer 3, a portion corresponding to the pregroove 6 serves as a recording track. On this recording track, user data which has been subjected to the error correction encoding and the EFM modulation is recorded.

Figure 3:
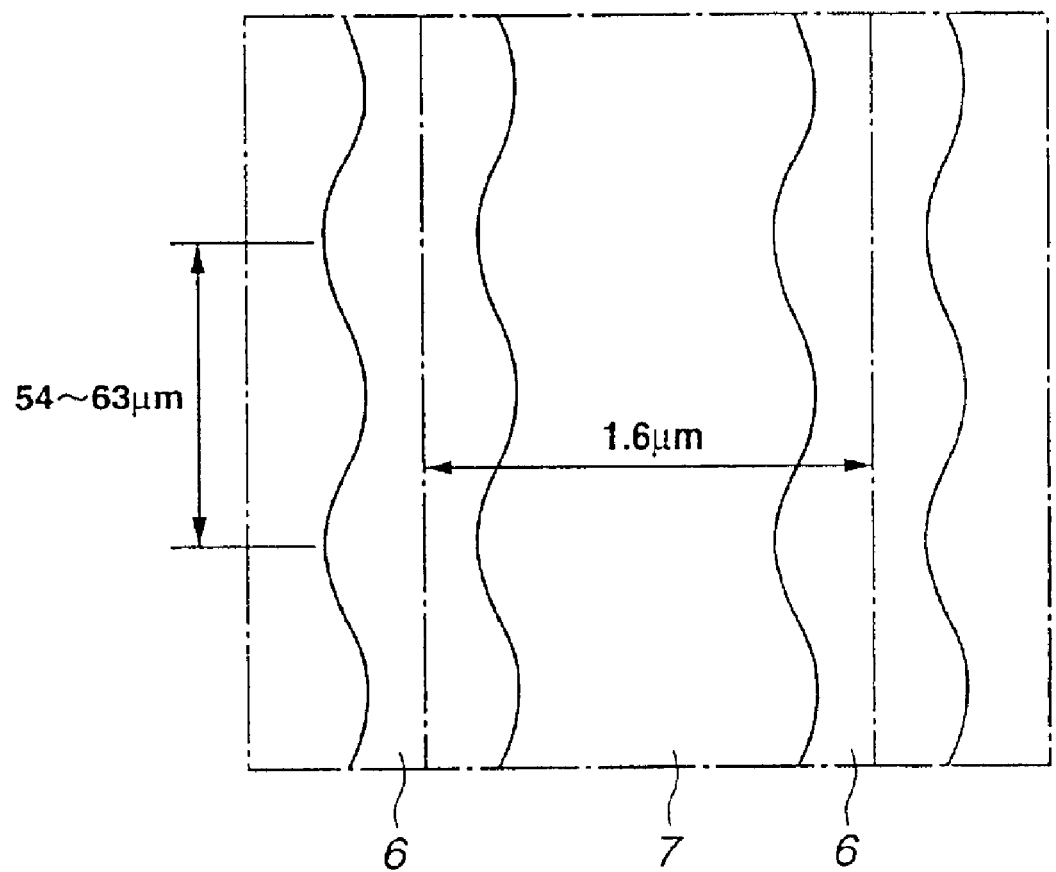
FIG. 3 is a plan view of an essential portion of the disc substrate of the optical disc.

In this optical disc 1, as shown in FIG. 1 to FIG. 3, a land 7 is defined between adjacent pregrooves 6 and the interval of the track centers in the pregrooves is called a track pitch.

Moreover, the pregroove 6 is formed so as to wobble in a sinusoidal wave shape. With this wobbling, position information which has been FM-modulated, i.e., the time axis information indicating an absolute position on the recording track is recorded as the ATIP (absolute time in pregroove) signal. In case of the CD-ROM (read only memory), it is possible to utilize the absolute time information encoded in the subcode Q. However, in case of the writable optical disc 1, this information cannot be utilized in the disc before recording (blank disc) and the ATIP signal by wobbling is used as the absolute time information.

Figure 4:
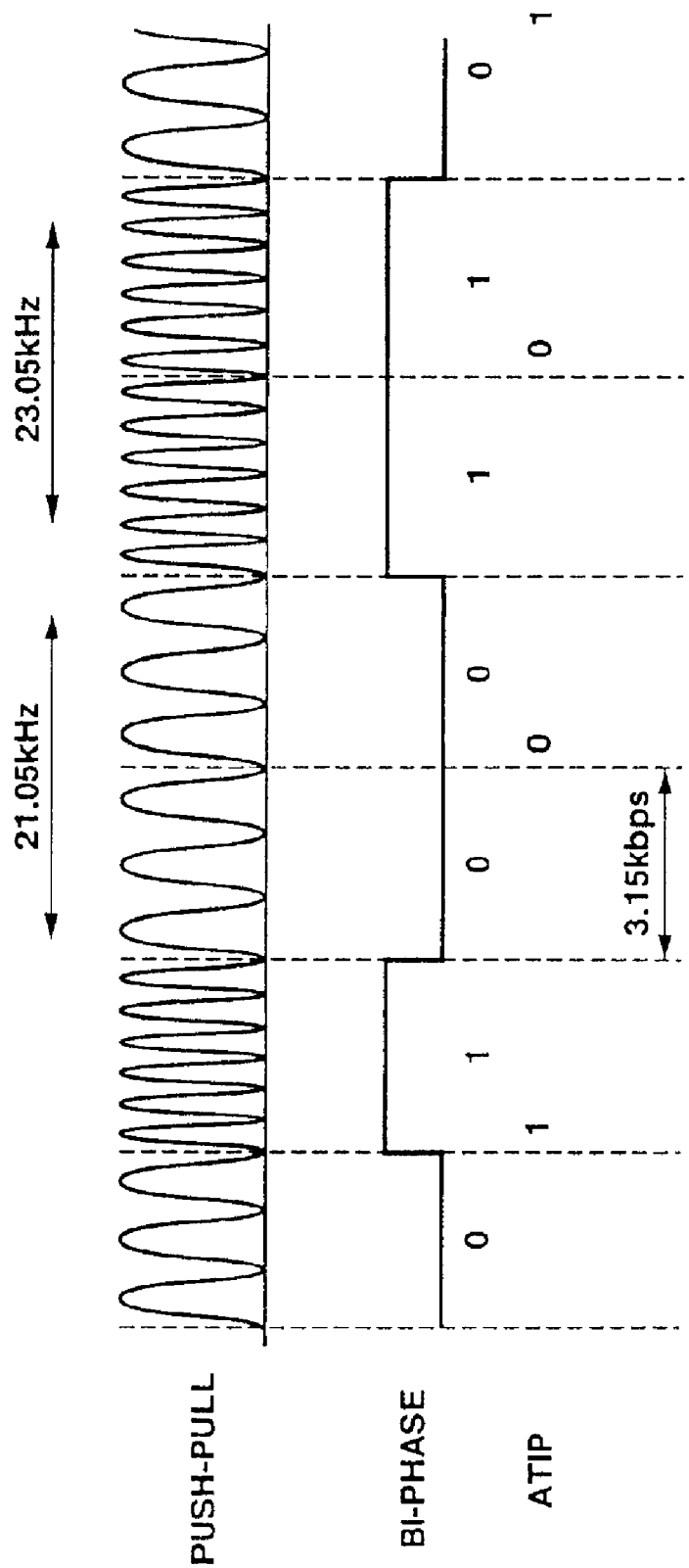
FIG. 4 explains the ATIP signal.

As shown in FIG. 4, this ATIP signal is a wobble signal detected by push-pull and subjected to the bi-phase modulation and FM modulation. More specifically, the ATIP signal is used to control and rotate the spindle motor for driving/rotating the optical disc 1 and accordingly, 1 alternates with 0 with a predetermined cycle and bi-phase modulated so that the average number of 1 and 0 is 1:1 and FM-modulated so that the average frequency is 22.05 kHz.

When this ATIP signal controls rotation of the spindle motor, so that the center frequency is 22.05 kHz for example when the optical disc 1 is rotated at the standard velocity, then the optical disc 1 is rotated at a linear velocity of about 1.2 m/s to 1.4 m/s defined by Read Book.

Moreover, one sector of the ATIP signal corresponds to one data sector (2352 bytes) of the user data. When writing a user data, writing is performed while synchronizing the data sector of the user data with the ATIP signal sector.

Moreover, in the ATIP signal, laser beam recording power values recommended by the manufacturer is recorded. It should be noted that the optimal value of the recording power is actually changed depending on various conditions and there is a step for determining an optimal recording power prior to recording which is called OPC (optimum power control). Moreover, the ATIP signal has an application code recorded to indicate the disc purpose: Restricted use which is further classified into the General purpose and Special purpose such as photo CD and Karaoke CD, and Unrestricted use.

It should be noted that for example, in the optical disc 1, the track pitch is 1.6 micrometers, the wobbling cycle is 54 micrometers to 63 micrometers, and the wobbling meander amount is in a range plus and minus 0.03 micrometers.

By the way, in the writable optical disc 1 such as the CD-R and CD-RW, as shown in FIG. 5, as the data recording region 10 for data writing to the signal recording layer 3, a read-in area 11, a program area 12, and a read-out area 13 are provided. More specifically, in this optical disc 1, the diameter is 120 mm which is used as follows. The read-in area 11 is arranged over the area of 46 mm to 50 mm, the program area 12 is arranged over the area 50 mm to 116 mm, and the read-out area 13 is arranged over the area of 116 mm to 118 mm.

Moreover, this optical disc 1 includes, at a position inner of the read-in area 11, a PCA (power calibration area) 14 for writing to optimize the laser beam recording power and a PMA (program memory area) 15 for temporarily storing contents information required when performing additional writing. Moreover, the PCA 14 has a test area for performing actual writing and a count area for recording the use state of this test area.

That is, this optical disc 1, as shown in FIG. 5, includes the PCA 14, the PMA 15, and the data storage area 10 consisting of the read-in area 11, the program area 12, and the read-out area 13.

It should be noted that the optical disc 1 may have a so-called multi-session configuration, i.e., may include a plurality of sessions, each consisting of the read-in area 11, the program area 12, and the read-out area 13 as the data recording region 10.

In the data recording region 10, the read-in area 11 is used for reading out data which has been written into the program area 12 such as TOC (table of contents) information. During reproducing, the TOC information is read from this read-in area 11, so that the optical pickup of the optical disc apparatus can instantaneously access a desired logical track.

On the other hand, the read-out area 13 is used for recording various information associated with the optical disc. Moreover, the read-out area 13 also has a function as a buffer region for preventing overrun of the optical pickup of the optical disc apparatus.

As shown in FIG. 6A, the program area 12 is a region where user data is actually written and has a plurality of logical tracks corresponding to the number of data items recorded. Moreover, each of the logical tracks 16 has a pre-gap 17 where information associated with the logical tracks 16 is recorded and a user data region 18 where actual user data is recorded on packet basis.

As shown in FIG. 6B, in this user data region 18, a fixed-length packet write method is used. That is, when recording user data on packet basis, for example, one packet 19 has length fixed to a predetermined data block. More specifically, this fixed-length packet write method forms a plurality of logical tracks 16 in the program area 12 of a writable optical disc 1 and the user data region 18 of each of the logical tracks 16 is divided into a plurality of packets 19. The number of user data blocks (block length) of each of the packets 19 in one logical track 16 is fixed to the same number and data is recorded all at once for each of the packets 19. Accordingly, in the fixed-length packet write method, packets 19 have an identical packet length in one logical track 16. In other words, in the fixed-length packet write method, the packets 19 contain identical number of user data blocks.

Moreover, in the optical disc 1, when the data recording region 10 is formatted, the fixed-length packet is buried over the entire region of the logical track 16.

It should be noted that the present embodiment may also employ a variable-length packet method in which length of one packet can be varied.

As shown in FIG. 6C, the packet 19 consists of a plurality of data blocks 20 as an access unit when accessing user data from the optical disc apparatus and normally contains 2352-byte user data.

Moreover, the packet 19 has a linking block 21 required for writing over two adjacent packets 19. The linking block 21 is arranged in accordance with a predetermined linking rule as a guard region for preventing failure of a user data at the write linking position when the user data is interleaved. That is, the linking block 21 consists of a link block 22 added at the head of the packet 19, four run-in blocks 23 arranged continuous to this link block 22, and two run-out blocks 24 arranged at the end of the packet 19.

Accordingly, the data block 20 of the preceding packet 19 and the data block 20 of the following packet 19 are written continuously via the linking block 21 consisting of the run-out block 24 added to the end of the preceding packet 19 and the link block 22 and the run-in block 23 added to the head of the following packet 19.

Figure 7:
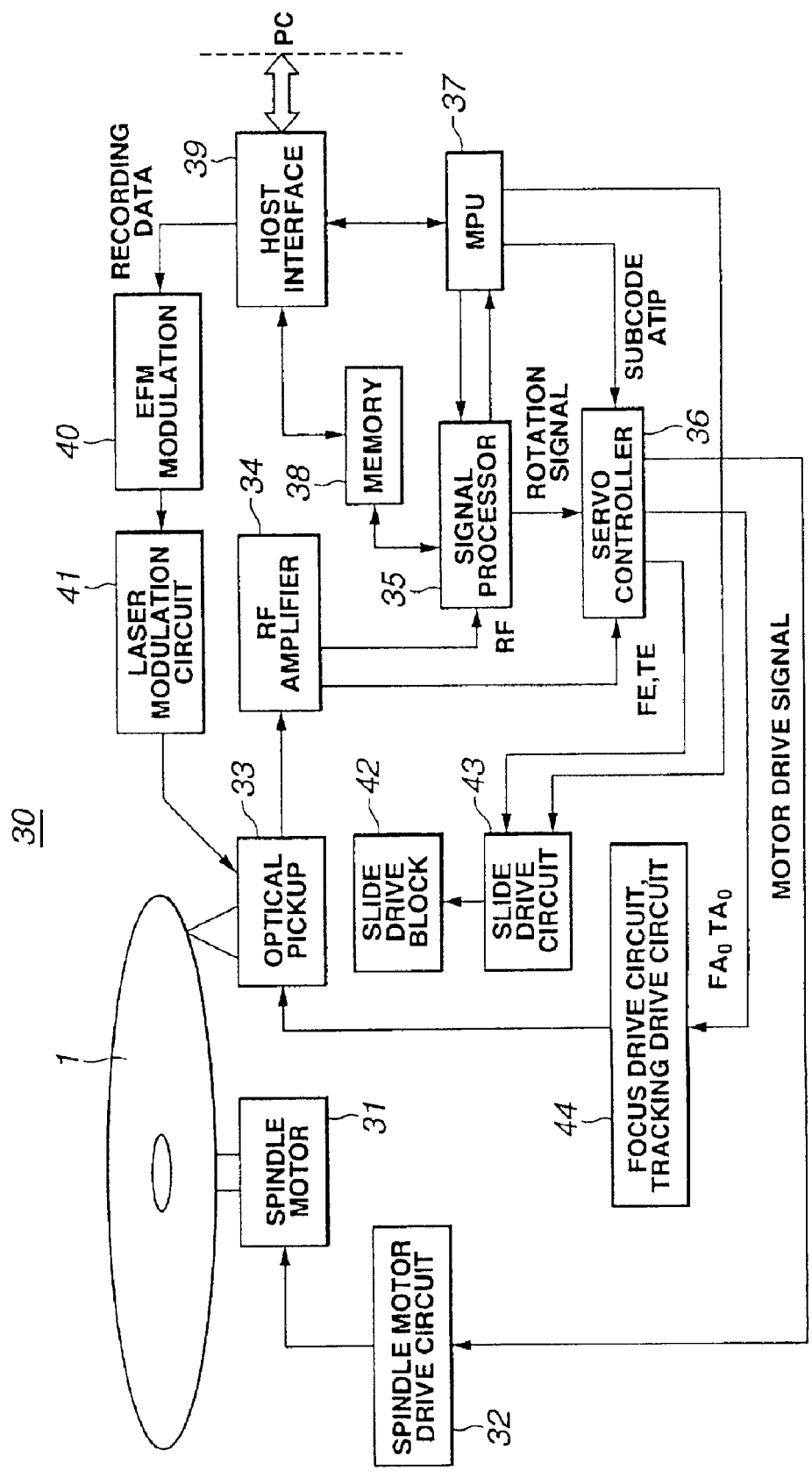
FIG. 7 briefly shows a configuration example of an optical disc apparatus according to the present invention.

Next, explanation will be given on an example of an optical disc apparatus according to the present invention with reference to FIG. 7.

In this optical disc apparatus 30, an optical disc 1 is driven to rotate by a spindle motor 31 having a rotation speed controlled by a spindle motor drive circuit 32. An optical pickup 33 applies a laser beam to the optical disc 1 and detects intensity of the return beam reflected from this optical disc 1 (reflectance change). the output signal detected is fed to an RF amplifier 34. The RF amplifier 34 performs a signal processing such as signal amplification to the output signal, thereby generating an RF signal (RF), a focus error signal (FE), and a tracking error signal (TE). The RF signal (RF) is supplied to a signal processor 35 while the focus error signal (FE) and the tracking error signal (TE) are supplied to a servo controller 36.

In the signal processor 35, from the RF signal (RF) subjected to EFM modulation and error correction, subcode information and ATIP information are extracted. These information items are used by a MPU 37 to perform various controls. Moreover, a memory 38 is used by the signal processor 35 to perform the EFM modulation and error correction. Moreover, the memory 38 is used as a cache for temporarily storing data transmitted from a host interface 39 and transferring data to a host computer (PC).

Moreover, data recorded on the optical disc 1 is transmitted from the host computer (PC) via the host interface 39 to the memory 38 and temporarily stored there or transmitted directly via the host interface 39 to the EFM modulator 40. The recorded data transmitted to the EFM modulator 40 is modulated by a laser modulation circuit 41 and the output signal of this recorded data is fed to the optical pickup 33. According to the output signal transmitted from the laser modulation circuit 41, the optical pickup 33 is driven by a slide drive block 42 while applying a laser beam to the optical disc 1 so as to write data.

The slide drive block 42 is controlled and driven by the slide drive circuit 43. That is, the slide drive circuit 43 controls drive of the slide drive block 42 in accordance with a control signal transmitted from the servo controller 36 and the MPU 37. The servo controller 36 converts the focus error signal (FE) and the tracking error signal (TE) transmitted from the RF amplifier 34 and a disc rotation signal from the signal processor 35 into control signals for performing various servo controls. That is, the focus error signal (FE) is converted into $FA_O$ signal for driving/controlling an objective lens so as to be focused with respect to the signal recording plane of the optical disc 1 by the servo controller 36 and the signal is transmitted to a focus drive circuit 44. Moreover, the tracking error signal (TE) is converted into $TA_O$ signal for positioning the laser beam onto the track center of the optical disc 1 by the servo controller 36 and the signal is transmitted to the tracking drive circuit 44. Moreover, the disc rotation signal is converted into a motor drive signal for driving/controlling the spindle motor 31 by the servo controller 36 and the signal is transmitted to the spindle motor drive circuit 32.

The focus drive circuit and the tracking drive circuit 44 performs servo control of the optical pickup 33 in accordance with the signals $FA_O$, and $TA_O$ supplied from the servo controller 36. Moreover, the spindle motor drive circuit 32 drives/controls the spindle motor 31 in accordance with the motor drive signal supplied from the servo controller 36.

In this optical disc apparatus 30, during a recording, a laser beam of recording power is applied to the signal recording layer 3 of the optical disc 1, thereby forming a recording mark at the position where the laser beam was applied. Thus, a data write is performed onto the optical disc 1. On the other hand, during a reproducing, a laser beam of reproducing power is applied to the signal recording layer 3 where the recording mark has been formed and a reflectance change of the return light depending on presence/absence of the recording mark is detected. Thus, a data read is performed from the optical disc 1.

Moreover, this optical disc apparatus 30 has a so-called blank function for erasing data over the entire surface of the optical disc 1 and a so-called minimally blank function for pseudo-erasing data by erasing only the contents information of the logical track 16 having data of the optical disc 1 recorded. That is, by using this minimally blank function, it is possible to pseudo-erase all the data recorded in the program area 12 by erasing the data as the contents information recorded in the PMA 15, the data recorded in the read-in area 11 and the read-out area 13, and the data recorded in the pre-gap 17 of the logical track 16. Accordingly, it is possible to erase the data recorded on the optical disc with a minimum time.

Figure 8:
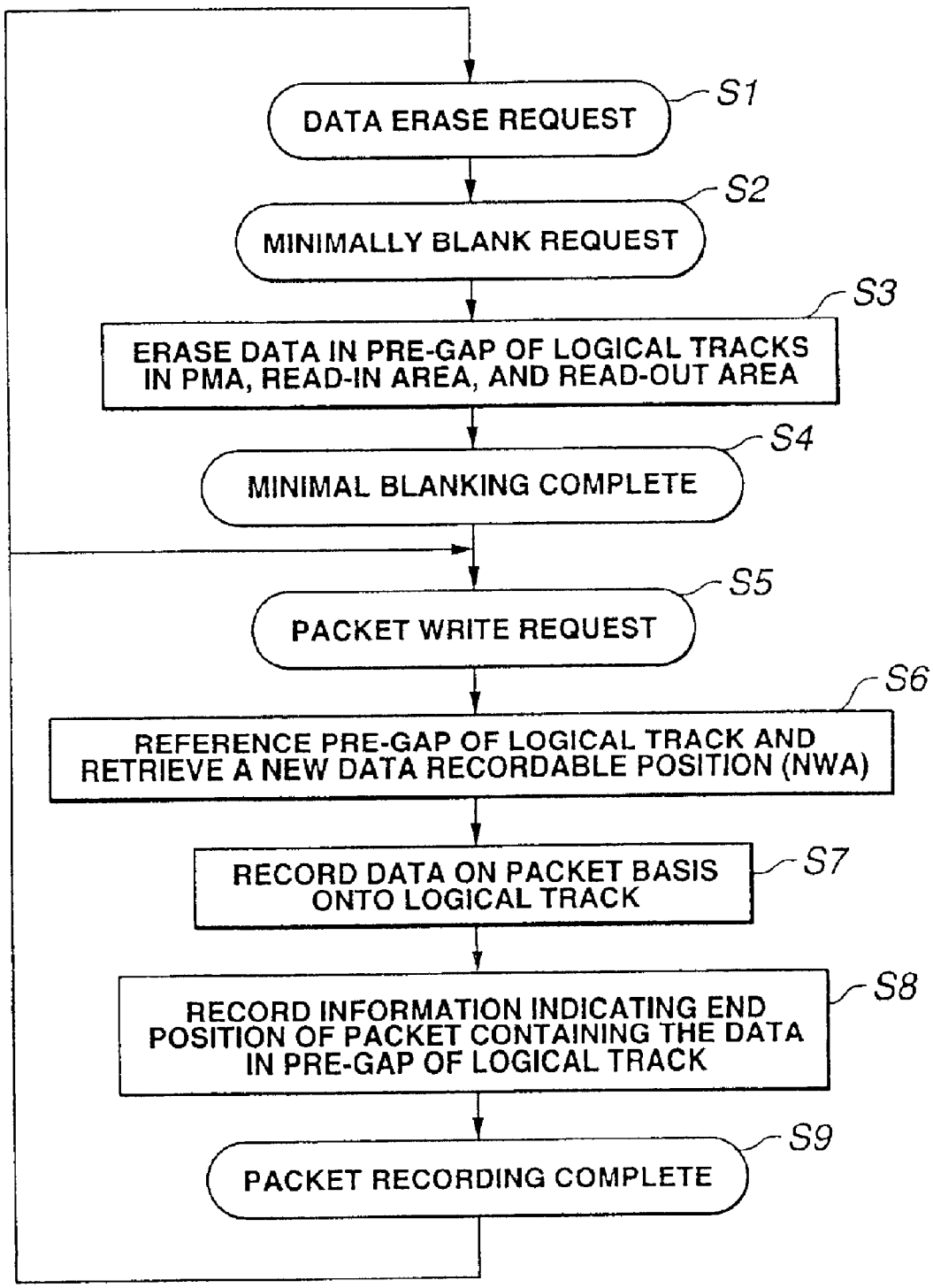
FIG. 8 is a flowchart explaining a data recording method according to the present invention.

Next, explanation will be given on the data recording method according to the present invention with reference to the flowchart shown in FIG. 8.

Firstly, in step S1, a data erase is requested for the optical disc 1. In step S2, if a data pseudo-erasing is requested for pseudo-erasing the data recorded in the program area 12, then in step S3, the optical disc apparatus 30 erases the data recorded in the PMA 15, the data recorded in the read-in area 11 and the read-out area 13 of the data recording region 10, and the data recorded in the pre-gap 17 of the logical track 16 on the optical disc 1.

Thus, in step S4, the pseudo-erasing of the data is complete. Here, on the optical disc 1, the logical track 16 where the data has been pseudo-erased actually contains the data prior to the minimal blanking. That is, on this optical disc 1, only the contents information of the logical track 16 containing data recorded is erased while the actual data remains recorded on the logical track 16.

Next, if a data write by packet write is requested in step S5, then in step S6, the pre-gap 17 of the logical track 16 is referenced to retrieve a new data writable position (NWA). In step S7, in the logical track 16 where the data has been pseudo-erased (minimally blanked), a new data is recorded on packet basis. It should be noted that since this is a first data write request after the data minimal blanking, no information is recorded at the pre-gap 17 of the logical track 16 to indicate the end position of the packet 19 where the data is recorded, and it is determined that no data is recorded so that a new data is additionally written starting at the head of this logical track 16.

Next, in step S8, information is recorded at the pre-gap 17 of the logical track 16 to indicate the end position of the packet 19 where the data is recorded.

It should be noted that when a plurality of logical tracks 16 are present, information indicating the end position of the packet 19 is recorded in the pre-gap 17 of the first logical track 16. Moreover, in the optical disc 1, when a plurality of sessions are present, contents information of the logical track 16 is recorded in the read-in area 11 and the read-out area 13 of the first session. In the case of this optical disc 1, if a data minimal blanking is requested in step S2, then in step S3, the optical disc apparatus 30 erases the data recorded in PMA 15, the data recorded in the read-in area 11 and the read-out area 13 of the first session, and the data recorded in the pre-gap 17 of the first logical track 16 of the optical disc 1.

Thus, in step S9, the additional data write by the packet write is complete.

By the way, conventionally, when an additional data write is performed by packet write after a minimal blanking of data is performed on the logical track, in the area where the data of the logical track has been pseudo-erased, actually a data prior to the minimal blanking is recorded. Accordingly, this pseudo-erased data may be considered to be an actual data and an additional data write may be started at an incorrect position.

As compared to this, according to the present invention, in step S8, information indicating the end position of the packet 19 having data recorded is recorded in the pre-gap 17 of the logical track 16.

After the information indicating the end position of the packet 19 is recorded in the pre-gap 17 of the logical track 16 where data has been recorded in step S8, if a new data write by packet write is requested in step S5, then in step S6, the information indicating the end position of the packet 19 recorded in the pre-gap 17 of the logical track 16 is referenced to retrieve a new data recordable position (NWA). That is, the position following the end position of this packet 19 is the recordable position (NWA) and in step S7, after that end position of the packet having the data recorded, a new data is additionally written on packet basis. Then, in step S8, the information indicating the end position of the packet 19 having the new data recorded is recorded in the pre-gap 17 of the logical track 16. This updates the information indicating the end position of the packet 19 having a new data recorded.

Thus, in the technique of the present invention, information indicating the end position of the packet 19 having data recorded is recorded in the pre-gap 17 of the logical track 16. Accordingly, when an additional data write is performed by packet write after minimal blanking of data, it is possible to record a new data on the logical track 16 where data has been pseudo-erased.

This enables to accurately detect a new data recordable position NWA and to properly record a new data on the logical track 16 where data has been pseudo-erased.

Moreover, conventionally, a new data recordable position NWA in the logical track should be found while retrieving from the head to the end of the logical track. As compared to this, according to the present invention, information indicating the end position of the packet 19 having data recorded is recorded in the pre-gap 17 of the logical track 16 and it is possible to significantly reduce the time required for retrieving a new data recordable position NWA. Accordingly, it is possible to significantly increase the data recording speed on the optical disc 1.

Figure 9:
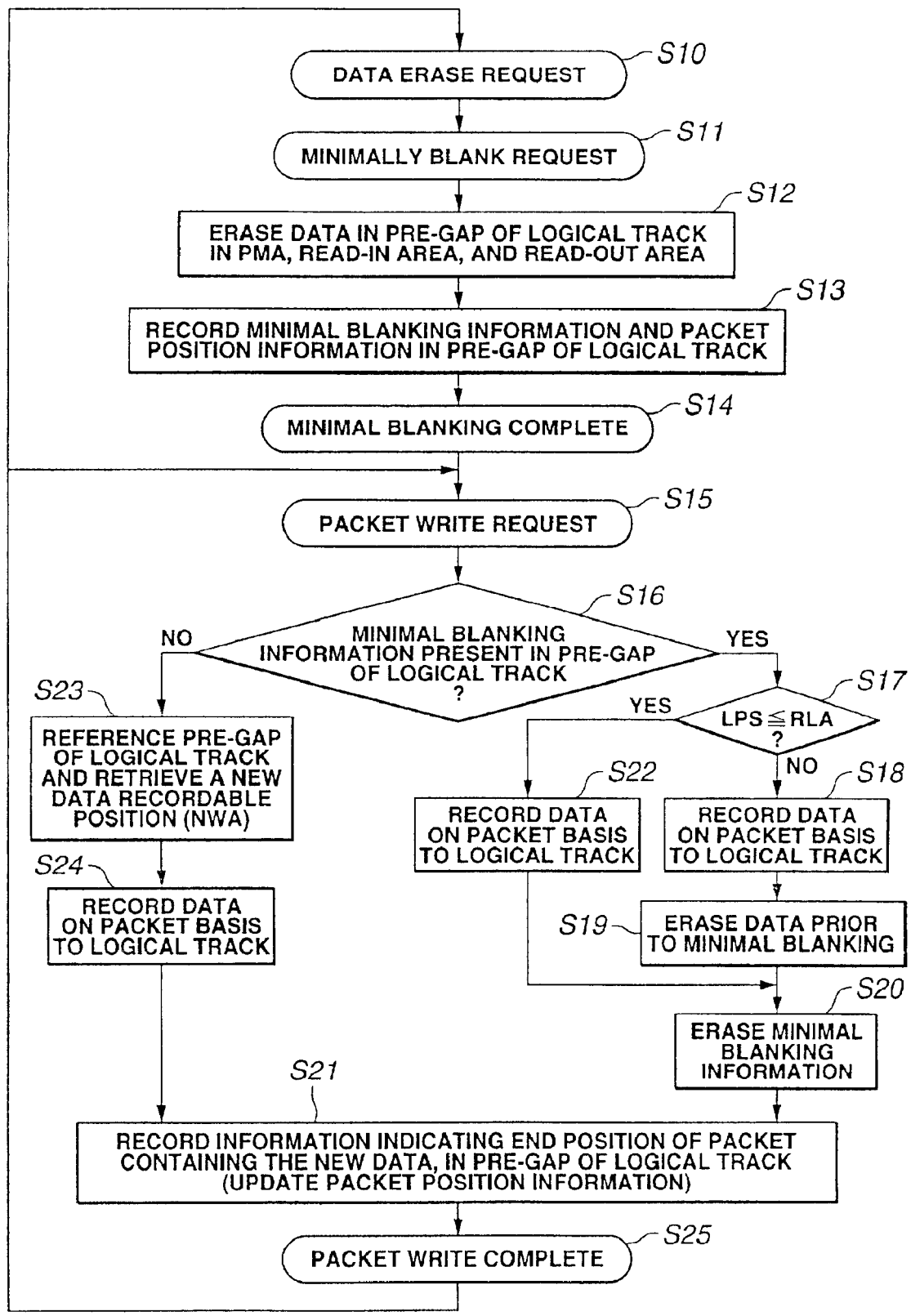
FIG. 9 is a flowchart explaining another data recording method according to the present invention.

Next, explanation will be given on another example of the data recording method according to the present invention with reference to a flowchart shown in FIG. 9.

Firstly, if in step S10, a data erase is requested for the optical disc 1 and in step S11 a minimal blanking, i.e., pseudo-erase of data recorded in the program area 12 is requested, then in step S12, the optical disc apparatus 30 erases data recorded in the PMA 15, the data recorded in the read-in area 11 and the read-out area 13 of the data recording region 10, and the data recorded in the pre-gap 17 of the logical track 16 of the optical disc 1.

Next, in step S13, minimal blanking information indicating that data has been pseudo-erased and packet position information indicating the end position of the packet 19 having data recorded are recorded in the pre-gap 17 of the logical track 16. It should be noted that this packet position information is information (LPA) indicating the end position of the packet 19 having the previous data recorded before the minimal blanking of the logical track 16. Thus, the data minimal blanking is complete in step S14.

Next, if in step S15 a new data write by packet write is requested, then in step S16 the pre-gap 17 of the logical track 16 is referenced to determine whether a minimal blanking indicating that data has been pseudo-erased is present. If the pre-gap 17 of the logical track 16 contains a minimal blanking information, control is passed to step S17.

In step S17, the LPA recorded in the pre-gap 17 of the logical track 16 is compared to the RPA, i.e., information indicating the end position of the packet where a new data of the logical track 16 is recorded. That is, it is determined whether a new data is completely overwritten (updated) up to the end position of the packet where data has been pseudo-erased in this logical track 16.

If in step S17 LPA>RPA is determined, i.e., a new data cannot be completely overwritten to the packet end position where data has been pseudo-erased, control is passed to step S18.

In step S18, a new data in recorded starting at the head of the logical track 16. In step S19, the data is erased prior to the minimal blanking, Thus, in the logical track 16, no data recorded prior to the minimal blanking remains and a new data is additionally written.

Next, in step S20, the minimal blanking information recorded in the pre-gap 17 of the logical track 16 is erased and control is passed to step S21.

On the other hand, in step S17, if LPA≦RPA is determined, i.e., if it is determined that a new data can be completely overwritten for the end position of the packet having data pseudo-erased, control is passed to step S22.

In step S22, a new data is recorded starting at the head of the logical track 16.

Thus, in the logical track 16, a new data is additionally written without leaving the data recorded prior to the minimal blanking and control is passed to the aforementioned step S20.

On the other hand, in step S16, if the pre-gap 17 of the logical track 16 has no minimal blinking information, control is passed to step S23.

In step S23, the packet position information recorded in the pre-gap 17 of the logical track 16 is referenced to retrieve a new data recordable position (NWA). In step S24, a new data is additionally written starting at the end position of the packet containing the data recorded and then control is passed to step S21.

Ins step S21, information indicating the end position of the packet containing the new data recorded is recorded in the pre-gap 17 of the logical track 16. Thus, in step S24, the data write by the packet write is complete.

Thus, according to the technique of the present invention, when additionally writing data by packet write after a minimal blanking of data, a new data can properly be written for the logical track 16 where data has been pseudo-erased. Moreover, it is possible to prevent remaining of the data recorded prior to the minimal blanking, in the logical track 16. Moreover, it is possible to correctly detect a new data recordable position NWA in a short period of time, thereby enabling to significantly increase the data recording speed on the optical disc 1.

It should be noted that in this technique, in steps S18 and S19, it is also possible to erase the data recorded prior to a minimal blanking before recording a new data starting at the head of the logical track 16.

Moreover, in this technique, when a first data is recorded on the logical track 16, it is also possible to record the information indicating the end position of the packet 19 containing this first data, in the pre-gap 17 of the logical track 16.

Moreover, when data recorded prior to a minimal blanking remains over a plurality of logical tracks 16, the aforementioned method is applied to each of the logical tracks 16. That is, in this technique, the aforementioned minimal blanking information and the packet position information are recorded for each of the logical tracks 16. This enables to properly record a new data for each of the logical tracks 16.

By the way, the aforementioned minimal blanking information and the packet position information are recorded by extending a reserved region of the TDB (track descriptor block) in the pre-gap 17 of the logical track 16.

This region is originally considered to be insignificant in the conventional optical disc (such as CD-R and CD-RW) and accordingly, an excellent affinity can be obtained with these conventional optical discs. Accordingly, the present invention has an advantage that compatibility with such a conventional optical disc and an optical disc apparatus can easily be obtained.

Here, explanation will be given on a method for extending a reserved region of the TDB (track descriptor Block) in the pre-gap 17.

It should be noted that FIG. 10 shows a TDB user data field and FIG. 11 shows a TDB format.

When a data write is performed by the track-at-once method or session-at-once method, the TDB contains user data field information about the attribute of the respective logical tracks 16 and serves as a region where data indicating the attribute of the logical track 16 is recorded.

As shown in FIG. 10, in this TDB, in accordance with the orange book specification, byte 13 to byte 23, byte 29 to byte 39, byte 45 to byte 55, and byte 61 to byte 71 are reserved regions. In this example, the aforementioned minimal blanking information and the packet position information are recorded in these reserved regions. It should be noted that the layout may be arbitrary. For example, in this example, as shown in FIG. 11, the minimal blanking information is recorded in byte 14 and the packet position information is recorded in byte 16 to byte 19. Thus, it is possible to assure affinity with the conventional optical disc and the optical disc apparatus.

Figure 12:
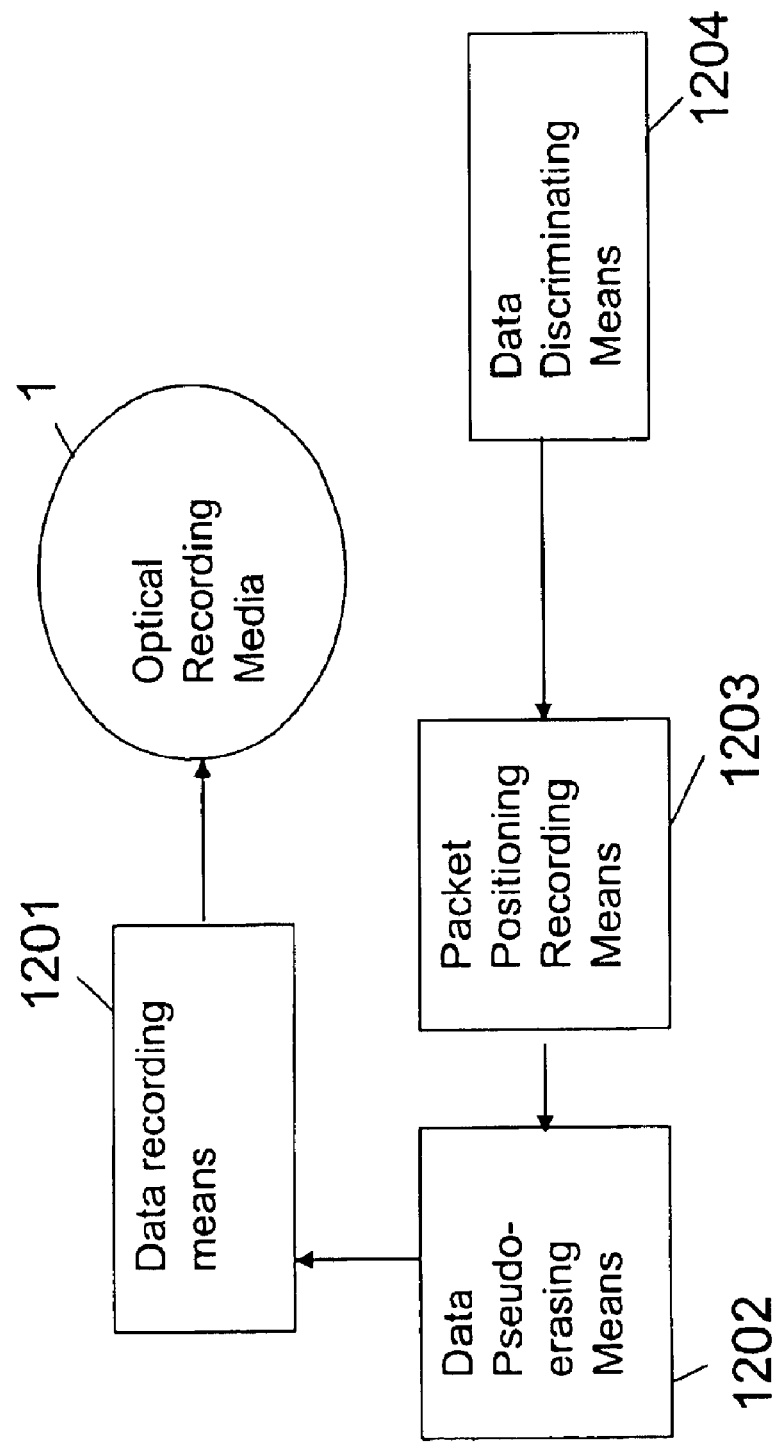
FIG. 12 is a block diagram of a system according to the present invention.

FIG. 12 is a block diagram of one embodiment of the present invention. A data recording means 1201 records data onto the optical recording media 1. A data pseudo-erasing means 1202 cooperates with the data recording means 1201 for erasing contents information of a track containing the data so as to pseudo-erase the data. A packet positioning recording means 1203 cooperates with the data pseudo-erasing means 1202 and data recording means 1201 to record information on the optical recording media 1 indicating an end position of the packet containing the data. A data discriminating means 1204 cooperates with the packet positioning recording means 1203 for discriminating whether new data up to the end position of the packet is to be updated in accordance with the information indicating the end position of the packet.

Figure 13:
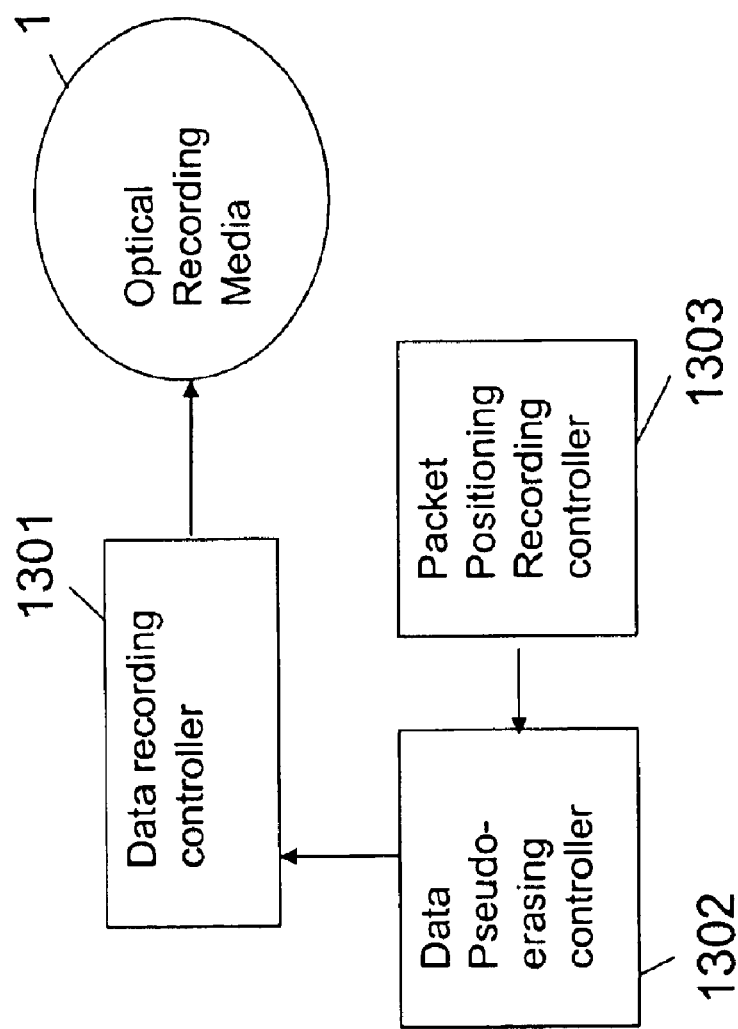
FIG. 13 is another block diagram of a system according to the present invention.

FIG. 13 is another block diagram of an embodiment according to the present invention. FIG. 13 is like that of FIG. 12, expect for a data recording controller 1301 that cooperates with a data pseudo-erasing controller 1302 with a packet positioning recording controller 1303, in order to provide pseudo-erasing and packet positioning functions.

As has been detailed above, according to the present invention, it is possible to accurately detect a new data recordable position within a short period of time and properly record a new data to the track where data has been pseudo-erased.

What is claimed is:

1. A data recording apparatus comprising:
   data recording means for recording data on a packet basis onto a track of an optical recording medium;
   data pseudo-erasing means for erasing contents information of the track containing the data, thereby pseudo-erasing the data; and
   packet position recording means for recording on the optical recording medium information indicating an end position of the packet containing the data,
   wherein the data recording means records new data onto the track for which the data has been pseudo-erased, in accordance with the information indicating the end position of the packet.

2. The data recording apparatus as claimed in claim 1, wherein the packet position recording means records the information indicating the end position of the packet in a pre-gap arranged on the track.

3. The data recording apparatus as claimed in claim 2, wherein the optical recording medium comprises a plurality of tracks and wherein the packet position recording means records the information indicating the end position of the packet in the pre-gap of a first track among the plurality of tracks.

4. The data recording apparatus as claimed in claim 1, further comprising data erase means for erasing the data which has been pseudo-erased.

5. The data recording apparatus as claimed in claim 4, wherein the data erase means erases the data pseudo-erased before the new data is recorded by the data recording means.

6. The data recording apparatus as claimed in claim 4, further comprising data discriminating means for discriminating whether new data up to the end position of the packet is to be updated in accordance with the information indicating the end position of the packet, wherein
   when the data discriminating means discriminates that the new data up to the end position of the packet is to be updated, the data recording means records the new data onto the track where the data has been pseudo-erased, and
   when the data discriminating means discriminates that the new data up to the end position of the packet is not to be updated, the data recording means records the new data onto the track where the data has been pseudo-erased and the data erase means erases the remaining of the data which has been pseudo-erased.

7. The data recording apparatus as claimed in claim 1, wherein the packet position recording means records on the optical recording medium information indicating the end position of the packet containing the new data.

8. The data recording apparatus as claimed in claim 1, further comprising pseudo-erased data recording means for recording on the optical recording medium information indicating that the data has been pseudo-erased.

9. The data recording apparatus as claimed in claim 1, wherein the optical recording medium comprises at least one logical track capable of recording data and each of the logical tracks comprises a plurality of the packets.

10. A data recording apparatus comprising:
    an optical head for irradiating light to an optical recording medium;
    a data recording controller for controlling the optical head so as to record data on a packet basis onto the optical recording medium;

a data pseudo-erasing controller for controlling the optical head so as to erase contents information of a track having the data recorded and pseudo-erase the data; and a packet position recording controller for controlling the optical head so as to record on the optical recording medium information indicating an end position of the packet in which the data has been recorded;

wherein the data recording controller, in accordance with the information indicating the end position of the packet, records new data onto the track for which the data has been pseudo-erased.

11. The data recording apparatus as claimed in claim 10, wherein the packet position recording controller records the information indicating the end position of the packet in a pre-gap arranged at a head of the track.

12. The data recording apparatus as claimed in claim 11, wherein the optical recording medium comprises a plurality of tracks and wherein the packet position recording controller records the information indicating the end position of the packet in the pre-gap of a first track among the plurality of tracks.

13. The data recording apparatus as claimed in claim 10, wherein the optical head further erases the data which has been pseudo-erased.

14. The data recording apparatus as claimed in claim 13, wherein the optical head erases the pseudo-erased data before control is performed to record the new data by the data recording controller.

15. The data recording apparatus as claimed in claim 13, further comprising data discriminating means for discriminating whether the new data up to the end position of the packet is to be updated in accordance with the information indicating the end position of the packet, wherein when the data discriminating means discriminates that the new data up to the end position of the packet is to be updated, the data recording means records the new data onto the track where the data has been pseudo-erased, and when the data discriminating means discriminates that the new data up to the end position of the packet is not to be updated, the data recording means records the new data onto the track where the data has been pseudo-erased and the optical head erases the remaining of the data which has been pseudo-erased.

16. The data recording apparatus as claimed in claim 10, wherein the packet position recording controller records on the optical recording medium the information indicating the end position of the packet containing the new data.

17. The data recording apparatus as claimed in claim 10, further comprising pseudo-erased data recording means for recording on the optical recording medium the information indicating that the data has been pseudo-erased.

18. The data recording apparatus as claimed in claim 10, wherein the optical recording medium comprises at least one logical track capable of recording data and each of the logical tracks comprises a plurality of the packets.

19. A data recording method comprising the steps of:

recording data on a packet basis onto a track of an optical recording medium and erasing contents information of the track containing the data, thereby pseudo-erasing the data;

recording on an optical recording medium information indicating the end position of the packet containing the data; and a step of records a new data onto the track for which the data has been pseudo-erased in accordance with the information indicating the end position of the packet.

20. The data recording method as claimed in claim 19, wherein the information indicating the end position of the packet is recorded in a pre-gap arranged at a head of the track.

21. The data recording method as claimed in claim 20, wherein the optical recording medium comprises a plurality of tracks and wherein the information indicating the end position of the packet is recorded in the pre-gap of a first track among the plurality of tracks.

22. The data recording method as claimed in claim 19, wherein the data pseudo-erased is erased before the new data is recorded by the data recording means.

23. The data recording method as claimed in claim 19, the method further comprising the step of discriminating whether the new data up to the end position of the packet is to be updated in accordance with the information indicating the end position of the packet, wherein when the new data up to the end position of the packet is discriminated to be updated, the new data is recorded onto the track where the data has been pseudo-erased, and when the new data up to the end position of the packet is discriminated not to be updated, the new data is recorded onto the track where the data has been pseudo-erased, and thereafter the remaining of the data which has been pseudo-erased is erased.

24. The data recording method as claimed in claim 19, further comprising the step of recording on the optical recording medium the information indicating the end position of the packet containing the new data.

25. The data recording method as claimed in claim 19, further comprising the step of recording on the optical recording medium the information indicating that the data has been pseudo-erased.

* * * * *